United States Patent Office 2,857,295
Patented Oct. 21, 1958

2,857,295
METHOD FOR IMPROVING ELECTRIC STORAGE BATTERIES

Henry Brown, Huntington Woods, Mich., assignor to The Udylite Research Corporation, Detroit, Mich., a corporation of Michigan No Drawing. Application February 28, 1955
Serial No. 491,211

13 Claims. (Cl. 136—154)

This invention relates to the use of a surface-active perfluoroalkane sulfonic acid or sulfonate as an additive to the electrolyte of the storage cells or batteries such as the lead storage battery and the Edison storage battery. More particularly it relates to the use of small percentages of perfluoroalkane sulfonic acids or sulfonates containing five to ten perfluoro carbon atoms in the electrolyte of electric storage batteries.

It has been found that certain perfluoroalkane sulfonic acids (Table I) are completely stable and permanent to the powerful oxidizing conditions existing at insoluble anodes during electrolysis of aqueous electrolytes, as for example at lead anodes during the formation of lead dioxide by anodic oxidation. No ordinary wetting agents or surface-active agents were found to be stable to the powerful oxidizing conditions existing at lead or lead alloy anode surfaces or at the lead dioxide surfaces and thus are of very little value. The lead dioxide which itself is a powerful oxidizing agent is formed or re-formed by powerful anodic oxidation when the cell or battery is charged or re-charged. It has been found that the compounds of Table I are completely stable not only to the lead dioxide, but to the even more powerful oxidizing conditions existing during charging.

The presence of the completely stable surface-active perfluoroalkane sulfonic acid (or sulfonate), as exemplified in Table I, dissolved in the battery electrolyte makes possible low surface tension values and the rapid and complete wetting-out and penetration by the electrolyte of the spongy lead, lead dioxide, and lead sulfate materials making up the electrodes of the lead cell or battery. This aids in decreasing the internal resistance of the cell and increasing the efficiency of the cell or battery. Ordinary surface-active agents on the other hand, because they react with lead dioxide, reduce or "run down" the efficiency of the cell or battery. Furthermore, the surface-active perfluoroalkane sulfonic acids cause the more rapid detachment of any hydrogen or oxygen bubbles (in the form of much smaller or finer bubbles) that may be formed at the cathodes and anodes respectively during electrolysis. The presence of adhering bubbles of hydrogen and oxygen on the cathodes and anodes interferes with uniform formation and conversion of the lead sulfate back to lead dioxide at the anode and lead at the cathode. Further, the exceptional wetting-out and penetrating action of the electrolyte containing the surface-active perfluoroalkane sulfonic acids insures a slower rate of current decay on the discharge of current from the cell or battery in both new and older batteries, and definitely makes for the formation of a finer particle size of lead dioxide during the re-charging. The finer particle size thus results in an increased surface area of active electrode material in a given cell or battery. This fine particle size of the active electrode material that is completely wetted out, makes possible an effective increase in active electrode surface area and brings about an increase in effectiveness of the battery between charges and discharges which in turn prolongs the time necessary before re-charging of the battery is needed, and in this way also increases the life and efficiency of the battery. Thus these additives are not only desirable for new storage batteries, but also for old ones.

The surface-active perfluoroalkane sulfonic acids or sulfonates decrease appreciably the evaporation of water from the electrolyte especially during warm days and active use, and also there is a sequestering or solubilization effect on certain salts such as those of calcium, which results in a decreased precipitation and decreased sensitivity of the cell or battery to such impurities that might enter the battery through impure water additions.

Only one addition of the compounds exemplified by Table I needs usually to be made for the life of the electrolyte of the cell or battery, that is, one addition to give a certain lowering of the surface tension of the electrolyte will result in quite a constant surface tension value as long as the electrolyte is not lost. This is true because of the complete stability of the compounds of Table I to all conditions of battery operation and charging. Surface tension values as low as 20 or 25 dynes/cm. can be obtained with the compounds of Table I and these values are lower than those obtainable with ordinary surface-active agents. Actually, the lowest values of the surface tension need not be employed for improved results, for values even of about 60 dynes/cm. show improvements over the plain electrolyte which has a surface tension of about 72 to 73 dynes/cm. This improvements are obtained with as little as 0.005 to 0.01 gram per liter of n-perfluoroctane 1-sulfonic acid (or its potassium, sodium, ammonium or lithium, etc. salt). The useful range of concentrations of the compounds exemplified by Table I is from about 0.005 gram per liter to saturation. Above concentrations of about 8 grams per liter in the cell or battery little additional improvement is obtained except for the lower molecular weight members, that is, those containing five or six perfluorocarbon atoms. Perfluoroalkane sulfonic acids containing more than about 10 perfluorocarbon atoms are not soluble in the electrolyte whereas those containing less than about 5 perfluorocarbon atoms do not produce the desired improvement. The five preferred examples are: perfluoro (para methyl cyclohexane) sulfonic acid in concentrations of about 0.1 to 6 grams per liter; perfluoro (para ethyl cyclohexane) sulfonic acid in concentrations of about 0.1 to 4 grams per liter; perfluoro (2-cyclohexyl ethane) 1-sulfonic acid in concentrations of about 0.05 to 3 grams per liter; perfluoro n-heptane 1-sulfonic acid in concentrations of 0.01 to 2 grams per liter, and perfluoro n-octane 1-sulfonic acid in concentrations of 0.005 to 1 gram per liter. Mixtures of the above may be employed, such as 0.01 to .02 gram per liter of perfluoro n-octane 1-sulfonic acid with 1 to 2 grams per liter of perfluoro (para ethyl cyclohexane) sulfonic acid. The compounds may be added as the free acids or as sulfonate salts such as the potassium, sodium, lithium or ammonium salts or even in certain cases as the pyridine salt. Examples 1 and 2 of Table I foam less in the electrolyte than Examples 3 and 4 containing respectively the same number of perfluoro carbon atoms. This is important during gassing or during water additions to the electrolyte, and the minimum foaming with the lowest surface tension can be obtained with Examples 1 and 2 of Table I at not higher than about 1 to 4 grams/liter concentration.

The compounds exemplified by Table I are also beneficial and stable in the alkaline electrolyte of the Edison storage cell or battery, and are not lost on standing or on electrolysis of the cell under the highest oxidizing conditions and just as they do not reduce lead dioxide in the lead storage battery, they do not reduce nickelic oxides ($Ni_2O_3$) or $NiO_2 \cdot xH_2O$. With the Edison cell, surface-active perfluoroalkane carboxylic acids (and their salts), such as perfluorohexanoic acid (perfluorohexane 1-carboxylic acid) and perfluoroctanoic acid (perfluoroctane 1-carboxylic acid) are satisfactory, whereas in the lead storage battery these perfluoroalkane carboxylic acids are of no value. These perfluoroalkane carboxylic acids can be employed in concentrations of 0.005 gram/liter to saturation. To the Edison cell electrolyte, it is preferred to add the compound as the potassium, sodium or lithium salt.

Table I

| | Concentration, grams/liter |
|---|---|
| (1) Perfluoro (para methyl cyclohexane) sulfonic acid 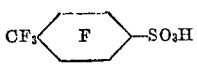 | 0.1-6 |
| (2) Perfluoro (para ethyl cyclohexane) sulfonic acid 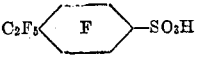 | 0.1-4 |
| (3) Perfluoro n-heptane 1-sulfonic acid  $CF_3(CF_2)_6SO_3H$ | 0.01-2 |
| (4) Perfluoro n-octane 1-sulfonic acid  $CF_3(CF_2)_7SO_3H$ | 0.005-1 |
| (5) Perfluoro (2-cyclohexyl ethane) 1-sulfonic acid 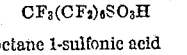 | 0.05-3 |
| (6) Perfluoro cyclohexane sulfonic acid 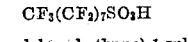 | 1-8 |
| (7) Perfluoro hexane 1-sulfonic acid  $CF_3(CF_2)_5SO_3H$ | 1-8 |

The perfluoroalkane sulfonic acids of this invention may be prepared by the process of U. S. Patent 2,732,398, and are usually best handled as the potassium, sodium, or ammonium salts. The term "sulfonic acid" as used in this specification and in the appended claims is intended to include the potassium, sodium, ammonium and other alkali metal salts. The essential part of the compound is the anion part.

The term "perfluoroalkane sulfonic acids" is intended to mean an alkane sulfonic acid in which all of the bonds of the carbon atoms are attached to fluorine, that is all of the bonds except that attached to the sulfonic acid group, and to each other.

Another advantage of the use of the compounds of Table I is in suppressing of mist and acid spray from the battery during use, thereby minimizing corrosion of electrical contacts and leads, besides keeping the acidic mist out of the atmosphere.

What is claimed is:

1. The method of improving electric storage batteries which comprises the step of adding to the electrolyte a perfluoroalkane acid containing at least 5 and not more than 10 carbon atoms and selected from the group consisting of sulfonic and carboxylic acids in an amount in the range of about 0.005 g./l. to saturation.

2. The method of improving electric storage batteries which comprises the step of adding to the electrolyte a perfluoroalkane sulfonic acid containing 6-8 carbon atoms in an amount in the range of about 0.005 g./l. to saturation.

3. The method of improving electric storage batteries which comprises the step of adding to the electrolyte at least 1 perfluoroalkane sulfonic acid selected from the group consisting of perfluoro (para methyl cyclohexane) sulfonic acid, perfluoro (para ethyl cyclohexane) sulfonic acid, perfluoro n-heptane 1-sulfonic acid, perfluoro n-octane 1-sulfonic acid and perfluoro (2-cyclohexyl ethane) 1-sulfonic acid in an amount in the range of about 0.005 gram/liter to saturation.

4. The method of improving electric storage batteries which comprises the step of adding to the electrolyte at least one perfluoroalkane sulfonic acid selected from the group consisting of perfluoro (para methyl cyclohexane) sulfonic acid in a concentration of 0.1 to 6 gram/liter, perfluoro (para ethyl cyclohexane) sulfonic acid in a concentration of 0.1 to 4 gram/liter, perfluoro n-heptane 1-sulfonic acid in a concentration of 0.01 to 2 gram/liter, perfluoro n-octane 1-sulfonic acid in a concentration of 0.005 to 1 gram/liter and perfluoro (2-cyclohexyl ethane) 1-sulfonic acid in a concentration of 0.05 to 3 gram/liter.

5. The method of improving lead storage batteries which comprises the step of adding to the electrolyte a perfluoroalkane sulfonic acid containing at least 5 and not more than 10 carbon atoms in an amount in the range of about 0.005 g./l. to saturation.

6. The method of improving lead storage batteries which comprises the step of adding to the electrolyte a perfluoroalkane sulfonic acid containing 6-8 carbon atoms in an amount in the range of about 0.005 g./l. to saturation.

7. The method of improving lead storage batteries which comprises the step of adding to the electrolyte at least 1 perfluoroalkane sulfonic acid selected from the group consisting of perfluoro (para methyl cyclohexane) sulfonic acid, perfluoro (para ethyl cyclohexane) sulfonic acid, perfluoro n-heptane 1-sulfonic acid, perfluoro n-octane 1-sulfonic acid and perfluoro (2-cyclohexyl ethane) 1-sulfonic acid in an amount in the range of about 0.005 gram/liter to saturation.

8. The method of improving lead storage batteries which comprises the step of adding to the electrolyte at least one perfluoroalkane sulfonic acid selected from the group consisting of perfluoro (para methyl cyclohexane) sulfonic acid in a concentration of 0.1 to 6 gram/liter, perfluoro (para ethyl cyclohexane) sulfonic acid in a concentration of 0.1 to 4 gram/liter, perfluoro n-heptane 1-sulfonic acid in a concentration of 0.01 to 2 gram/liter, perfluoro n-octane 1-sulfonic acid in a concentration of 0.005 to 1 gram/liter and perfluoro (2-cyclohexyl ethane) 1-sulfonic acid in a concentration of 0.05 to 3 gram/liter.

9. The method of improving electric storage batteries which comprises the step of adding to the electrolyte perfluoro (para methyl cyclohexane) sulfonic acid in an amount of about .01-6 gram/liter.

10. The method of improving electric storage batteries which comprises the step of adding to the electrolyte perfluoro (para ethyl cyclohexane) sulfonic acid in an amount of about 0.1-4 gram/liter.

11. The method of improving an Edison storage cell which comprises the step of adding to the electrolyte at least 1 perfluoroalkane carboxylic acid containing 6-8 carbon atoms in an amount in the range of about 0.005 gram/liter to saturation.

12. The method of improving electric storage batteries which comprises the step of adding to the electrolyte perfluoro n-octane 1-sulfonic acid in an amount of about 0.005 to 1 gram/liter.

13. The method of improving electric storage batteries which comprises the step of adding to the electrolyte perfluoro (2-cyclohexyl ethane) 1-sulfonic acid in an amount of about 0.05-3 gram/liter.

References Cited in the file of this patent

UNITED STATES PATENTS

| 2,441,896 | Moir | May 18, 1948 |
| 2,732,398 | Brice et al. | Jan. 24, 1956 |

FOREIGN PATENTS

| 534,618 | Great Britain | Mar. 12, 1941 |